United States Patent [19]

Takubo et al.

[11] Patent Number: 4,722,597

[45] Date of Patent: Feb. 2, 1988

[54] ELECTROOPTIC SHUTTER ARRAY ELEMENT

[75] Inventors: Yoneharu Takubo, Neyagawa; Yasutaka Horibe, Ibaraki; Nobue Yamanishi, Higashiosaka; Hideyuki Okinaka, Toyonaka, all of Japan

[73] Assignee: Matsushita Electric Industrial Co., Ltd., Osaka, Japan

[21] Appl. No.: 48,469

[22] Filed: May 8, 1987

Related U.S. Application Data

[63] Continuation of Ser. No. 743,472, Jun. 7, 1985, abandoned.

[30] Foreign Application Priority Data

Jun. 8, 1984 [JP] Japan ................... 59-118436
Jun. 8, 1984 [JP] Japan ................... 59-118473

[51] Int. Cl.$^4$ ................................ G02F 1/03
[52] U.S. Cl. .................... 350/387; 350/392; 350/393
[58] Field of Search ............... 350/355–356, 350/387, 388, 392–393, 331 T, 405; 358/232; 346/108; 355/71

[56] References Cited

U.S. PATENT DOCUMENTS

| | | | |
|---|---|---|---|
| 2,649,027 | 8/1953 | Mason ............... | 350/392 |
| 3,182,574 | 5/1965 | Fleisher et al. ........ | 350/388 |
| 3,393,956 | 7/1968 | Clark ............... | 350/356 |
| 4,505,552 | 3/1985 | Prohaska ........... | 350/392 |
| 4,636,817 | 1/1987 | Masaki ............. | 346/108 |

FOREIGN PATENT DOCUMENTS

| | | |
|---|---|---|
| 59-135425 | 8/1959 | Japan. |
| 58-9210 | 1/1983 | Japan ................... 350/392 |
| 73521 | 4/1985 | Japan ................... 350/356 |

OTHER PUBLICATIONS

Hacking et al., "Digital Recording Using Hologram Arrays: Laser-Beam Deflection and Modulation" Research Dept., Engineering Div., British Broadcasting Corp. 3-1979, BBC RD 1979/6, pp. 23-33.

Hacking et al., "Digital Recording Using Hologram Arrays: Development of the Transducers for an Experimental 100 mbit/s Recorder", Research Dept., Engineering Div., British Broadcasting Corp. 9-1979, BBC RD 1979/16, pp. 1-24.

PLZT Electrooptic Shutter, K. Tanaka et al., pp. 126-128, Supplements 22-2, Japanese Journal of Applied Physics, vol. 22 (1983).

PLZT Electrooptic Ceramics and Devices, Gene H. Haertling, American Chemical Society Symposium Papers, S.N. 164,265, 1981, pp. 265-282.

PLZT Linear Array Page Composer" Ferroelectronics, 1976, vol. 10, pp. 35-38.

*Primary Examiner*—William H. Punter
*Attorney, Agent, or Firm*—Wenderoth, Lind & Ponack

[57] ABSTRACT

An electrooptic shutter array element has a light transmissive substrate, a pair of electrodes having a plurality of opposed terminal portions formed on the substrate, a light shading mask provided with a plurality of windows corresponding to the opposed pairs of terminal portions of the electrodes, and a pair of polarizing plates provided in front and behind the substrate. The terminal portions and windows are properly arranged to distribute an electric field within each of the window areas so that the transmittance of the shutter array element is substantially constant regardless of a temperature change.

8 Claims, 9 Drawing Figures

ELECTROOPTIC SHUTTER ARRAY ELEMENT

This application is a continuation of application Ser. No. 743,472, filed June 7, 1985, and now abandoned.

BACKGROUND OF THE INVENTION

1. Field of the Invention

This invention relates to a solid-state electrooptic shutter array element using the electrooptic effect.

2. Description of the Prior Art

Recently, with the development of information processing techniques, printers as output equipment for an information processing system have become important, and various types of printers are now being developed. Among them the optical printer, a kind of non-impact printer, is one of the most remarkable types. A device comprising electrooptic shutter elements utilizing the electrooptic effect arranged in an array is useful as the writing device for the optical printer.

As present, the well-known electrooptic shutter array element using electrooptic material is so constructed that a plurality of opposite strip electrodes are provided on a light-transmission substrate of lanthanum-modified lead zirconate titanate (PLZT) which has the composition of La/Zr/Ti=9/65/35 and shows a remarkable Kerr effect, and polarizing plates are disposed on the front and back surfaces of the substrate.

The principle of operation of the electrooptic shutter is that the opposite electrodes on the PLZT substrate are given a potential difference to create double refraction on the PLZT, thereby changing polarization of the incident light. The PLZT electrooptic shutter has a characteristic of high response speed and has hitherto been well studied. Some examples of the PLZT electrooptic shutter array are disclosed in "PLZT LINEAR ARRAY PAGE COMPOSER" by George R. Laguna, Pages 35 to 38, Ferroelectrics, Vol. 10 (1976), and Elektronik Industrie, Page 26, Vol. 6 (1980).

Such PLZT electrooptic shutter, however, has a large problem in that its transmittance varies greatly with a temperature variation.

On the other hand, in order to solve the above problem of the temperature characteristic, some improvements, have been disclosed in the Japanese Patent Application Laid-Open No. 59-135425, and "PLZT Electrooptic Shutter" by K. Tanaka, Pages 126 to 128, Supplement 22-2, Japanese Journal of Applied Physics Vol. 22 (1983).

The above problem, however, has not yet been solved properly, and therefore a practically usable electrooptic shutter has not yet been developed.

SUMMARY OF THE INVENTION

An object of the present invention is to provide an electrooptic shutter array element which has a stable transmittance despite a temperature change.

In order to achieve the above object, an electrooptic shutter array element according to the present invention comprises: a light transmissive substrate made of a material having the Kerr effect; a pair of electrodes formed on at least one major surface of the light transmissive substrate, each electrode of the pair of electrodes having a plurality of terminal portions opposed to the plurality of terminal portions of the other electrode of the pair respectively; a light shading mask formed on the electrode-carrying surface of the light transmissive substrate and provided with a plurality of windows at positions corresponding to areas where the plurality of terminal portions of the pair of electrodes are opposed respectively; and a pair of first and second polarizing plates having polarizing axes perpendicular to each other, the first polarizing plate being provided on a back surface of the light transmissive substrate and the second polarizing plate being provided on a front surface of the light shading mask.

A light is radiated from behind of the electrooptic shutter array element so as to be incident on the first polarizing plate where it is polarized. The polarized light passes through the light transmissive substrate and part of it further passes through the windows of the mask to reach the second polarizing plate. When no voltage is applied between the pair of electrodes, the light polarized by the first polarizing plate reaches the second polarizing plate without its polarized state having changed, and therefore blocked by the second polarizing plate. When an appropriate voltage is applied between the pair of electrodes to change the polarized state of the light to an elliptically polarized state (by the Kerr effect) in the light transmissive substrate, a part of the light reaching the second polarizing plate can pass the second polarizing plate and come out of the shutter array element.

By properly selecting the area of the opening of each of the windows of the mask relative to the width of each of the terminal portions of the pair of electrodes, the change of transmittance of the shutter array element with respect to the temperature change can be effectively reduced. More specifically, the width of each of the windows is made larger than the width of each of the terminal portions of the electrodes.

The electrooptic shutter array element of the invention may be further provided with a plurality of transparent conductor segments distributed on the front surface of the light transmissive substrate at the areas where the plurality of terminal portions of the pair of electrodes are opposed, thereby to properly distribute the intensity of electric field produced by each pair of the opposing terminal portions of the pair electrodes. In this case, the width of each of the windows of the mask need not be larger than the width of each of the terminal portions of the electrodes.

Further, the shape of each of the terminal portions of the electrodes may be properly designed to distribute the intensity of electric field.

DESCRIPTION OF THE PREFERRED EMBODIMENTS

Figure 1:
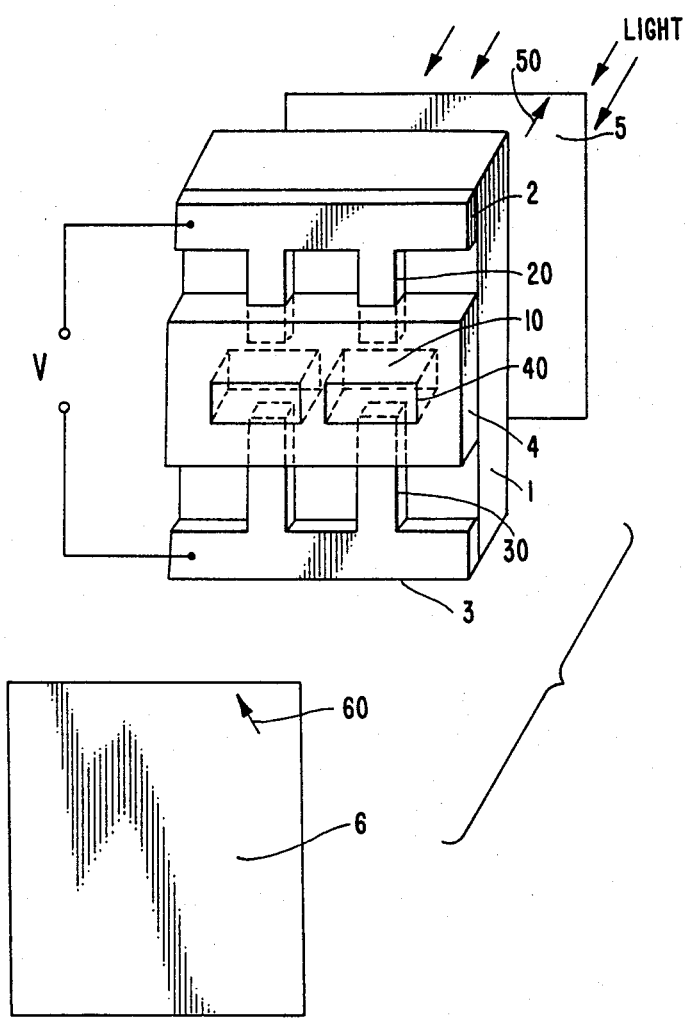
FIG. 1 is a schematic perspective view of a first embodiment of an electrooptic shutter array element of the invention.

FIG. 1 shows an embodiment of an electrooptic shutter array element. Referring to FIG. 1, on a major surface of a PLZT substrate 1 are provided a common electrode 2 having a plurality of terminal portions 20 and a voltage applying electrode 3 having a plurality of terminal portions 30, ends of the plurality of terminal portions 20 and 30 being spaced and opposed to each other respectively to produce therebetween electric fields respectively when a voltage is applied therebetween. A light shading mask 4 is provided on the main surface of the PLZT substrate 1 to cover the portion where the plurality of terminal portions 20 and 30 are disposed. The mask 4 is provided with a plurality of windows at portions each corresponding to an area 10 in the space between one of the terminal portions 20 and a corresponding one of the opposed terminal portions 30. On opposite sides of the PLZT substrate 1 are provided a pair of polarizing plates 5 and 6 having polarizing axes 50 and 60 which are inclined by +45° and −45° respectively with respect to the electric field vector generated between the terminal portions 20 and 30.

When a light is radiated from the behind the electrooptic shutter array element as shown by arrows in FIG. 1, the light is polarized to a linearly polarized light by the polarizing plate 5 in the polarizing direction 50. The polarized light passes through the PLZT substrate 1 and part of it passes through the windows 40 of the mask 4. When no voltage is applied between the electrode 2 and 3, the light remains polarized as it was by the polarizing plate 5 until it reaches the polarizing plate 6. Since the polarizing plate 6 has the polarizing axis 60 which is perpendicular to polarizing axis 50 of the polarizing plate 5, the light is blocked by the polarizing plate 6 so that it cannot come out of the shutter array element. This state is the "OFF" state of the electrooptic shutter array element.

On the other hand, when a voltage V is applied between the electrodes 2 and 3 to produce an electric field at each area 10 on the PLZT substrate 1 between a pair of terminal portions 20 and 30 of the electrodes 2 and 3, the light passing through the PLZT substrate 1 has its polarized state changed from the linearly polarized light to an elliptically polarized light due to the double refraction phenomenon of the PLZT substrate 1 (the Kerr effect). As a result, a part of the elliptically polarized light having a polarized axis corresponding to the polarizing axis 60 of the polarizing plate 6 passes through the polarizing plate 6 to come out of the shutter array element. This state is the "ON" state of the electrooptic shutter array element.

The operation of the general PLZT shutter array element is explained in detail in "PLZT Electrooptic Ceramics and Devices" by Gene H. HAERTLING, American Chemical Society Symposium Papers, Serial No. 164, 1981, pp. 265–282. The above description can be fully understood by referring to this reference.

Figure 2:
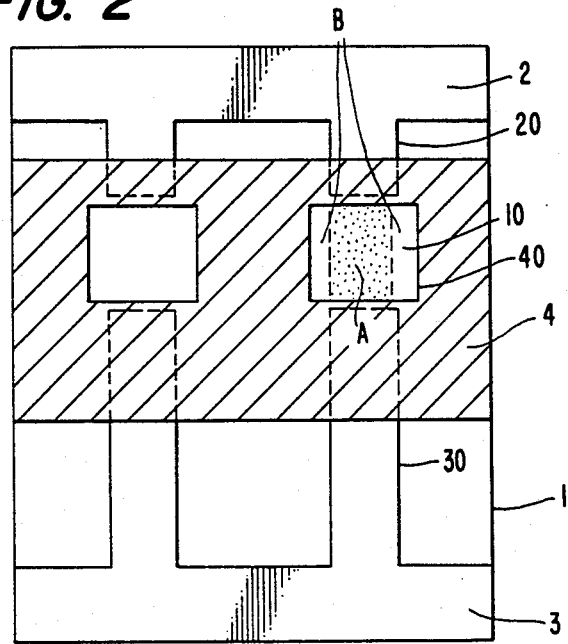
FIG. 2 is a schematic elevation view of the first embodiment.

FIG. 2 shows a front elevation view of the FIG. 1 embodiment, in which the polarizing plates 5 and 6 are not shown for avoiding complicating the view. Referring to FIG. 2, the width of the window 40 of the mask 4, i.e. the dimension perpendicular to the direction between the terminal portions 20 and 30, is made larger than the widths of the terminal portions 20 and 30 of the electrodes 2 and 3. In the area 10 on the surface of the PLZT substrate 1 corresponding to the window 40, the electric field in the dotted area A directly between the terminal portions 20 and 30 is denser than that in the area B at the sides of the area A. In other words, the intensity of the electric field in the area A is larger than that in the area B. More specifically, the intensity of the electric field is distributed such that it is maximum at the center of the area 10 and is gradually reduced at both sides of the center.

Figure 3:
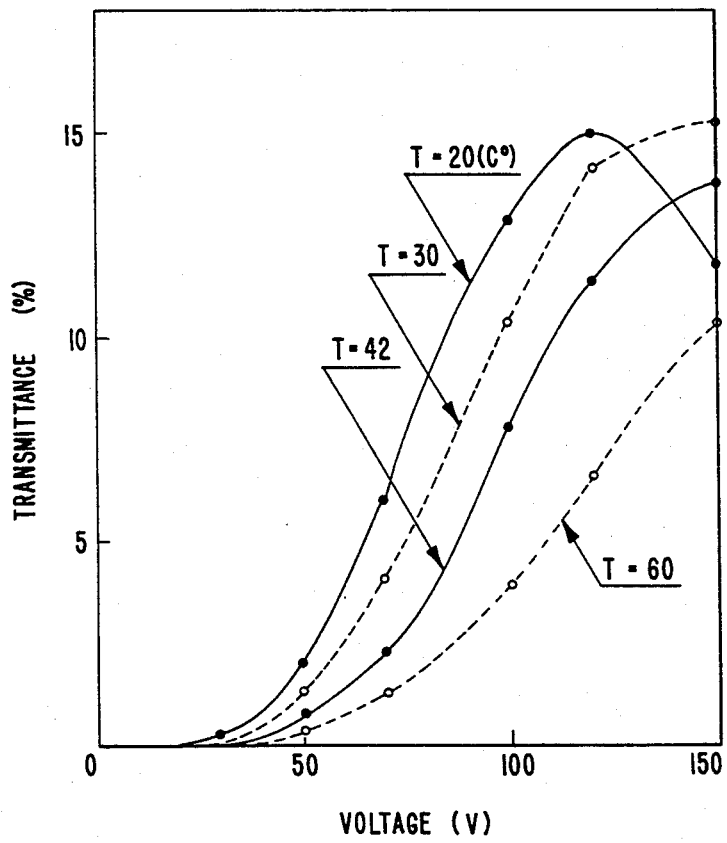
FIG. 3 is a graph showing the usual transmittance characteristic of a PLZT electrooptic shutter.
Figure 3A:
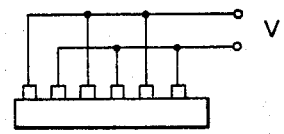
FIG. 3a is a schematic elevation view of a device for obtaining the curves of FIG. 3.

In general, the transmittance of the PLZT substrate is maximum when the light linearly polarized by the incident light polarizing plate 5 is changed to a linearly polarized light having the polarized axis perpendicular to that of the light from the incident light polarizing plate 5. The electric field necessary to satisfy this condition is the optimum electric field. When the intensity of the electric field is larger than that of the optimum electric field, the transmittance of the PLZT substrate is reduced. In general, the optimum electric field changes with a change in temperature. Accordingly, the transmittance of the PLZT substrate changes with a temperature change as shown in FIG. 3. The FIG. 3 characteristic curves are obtained by using a pair of interdigital electrodes each having a width of 50 μm and spaced from one another by 50 μm as shown in FIG. 3a.

Referring again to FIG. 2, the width of the terminal portions 20 and 30 of the electrodes 2 and 3 is selected in such a manner that, at room temperature, the intensity of the electric field in the area A is larger than that of the optimum electric field and the intensity of the electric field in the area B is equal to that of the optimum electric field. Accordingly, at the room temperature, the transmittance is maximum in the area B, and smaller than the maximum value in the area A. When the temperature rises, the intensity of the optimum electric field increases, so that the electric field in the area A becomes close to the optimum electric field. As a result, the transmittance increases in the area A, and decreases in the area B, so that total transmittance in the area 10 is maintained nearly constant. This principle is illustrated in FIG. 4.

Figure 4:
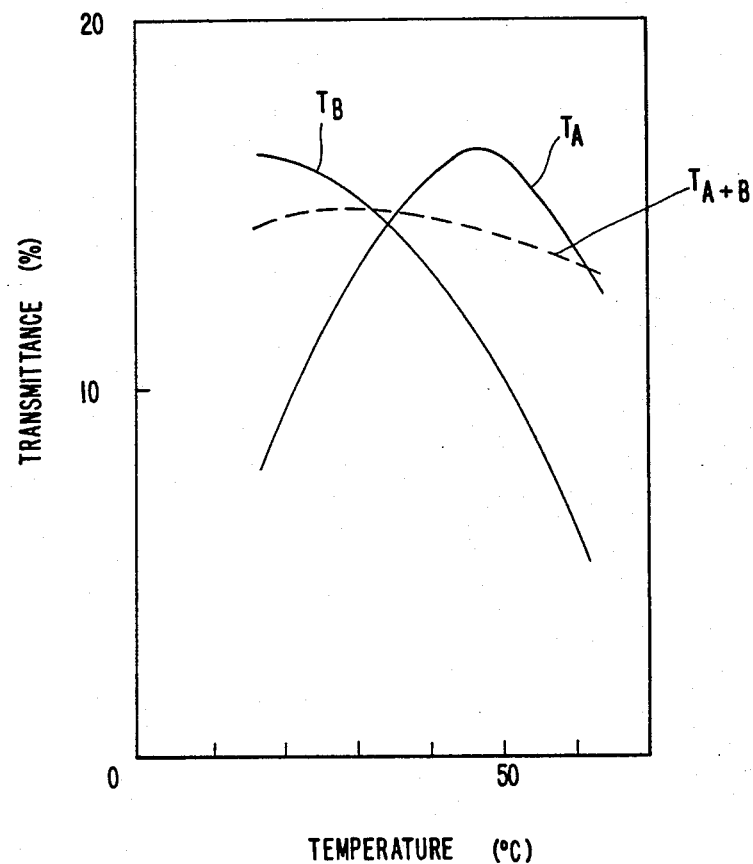
FIG. 4 is a graph explanatory of the principle of operation of the invention.

Referring to FIG. 4, the curve $T_A$ shows the transmittance change with the temperature change for area A, and the curve $T_B$ shows the transmittance change with the temperature change for area B. The change in the total transmittance in the area 10 becomes that of a curve $T_{A+B}$ shown by the broken line. The amount of change of the total transmittance $T_{A+B}$ is very small as is apparent from FIG. 4.

As described above, according to the present invention, the width of each of the electrode terminal portions is made smaller than that of each of the windows of the mask so that the electric field in each area on the surface of the PLZT substrate corresponding to each of the windows is distributed so as to give the transmittance curves as shown in FIG. 4.

EXAMPLE 1

Figure 5:
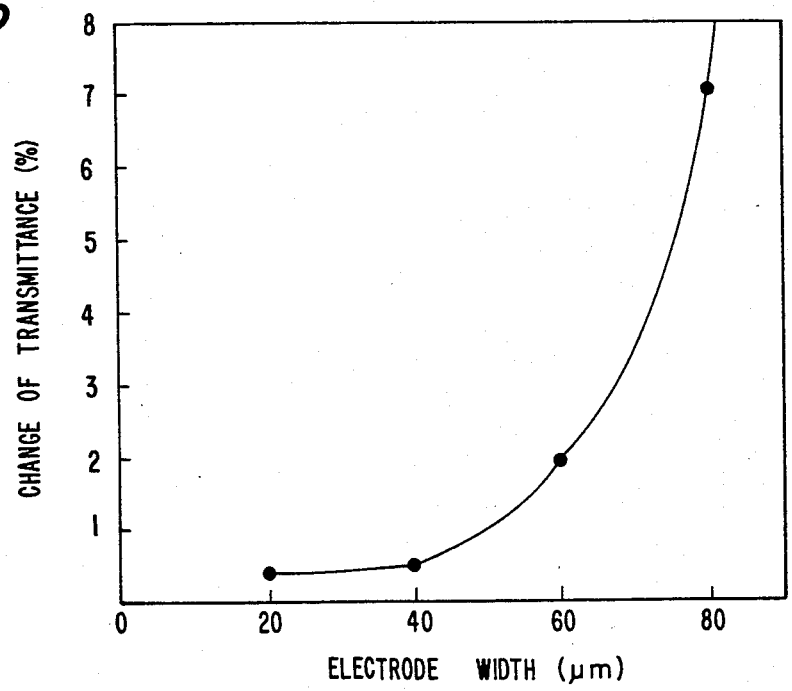
FIG. 5 is a graph showing the relation between the width of an electrode and change of transmittance in a range of a temperature of 20° to 60° C. in the first embodiment.

A PLZT flat plate having a composition of $(Pb_{0.91}, La_{0.09})(Zr_{0.65}, Ti_{0.35})O_3$ and a thickness of 300 μm was sliced and polished to provide PLZT substrates. Electrodes were formed on the surface of each of the PLZT substrates by depositing Cr to a thickness of 500 Å and Au to a thickness of 5000 Å, and shaped by photolithography so that the distance between each pair of opposed terminal portions was 60 μm, the pitch of the terminal portions of each of the pair of electrodes was 120 μm in the width of each of the terminal portions was 20–80 μm. Then, an insulating resin film (1 μm in thickness) was formed on the electrodes, an opaque metal film to function as a mask was deposited on the insulating resin film, and windows each 60 μm×50 μm were formed in the opaque metal film by photolithography. The thus obtained specimens were operated by applying optimum operating voltages as shown in Table 1 in the temperature range from 20° C. to 60° C. The amounts of transmittance change with respect to the electrode width (the width of each terminal portion) are shown in FIG. 5.

TABLE 1

| Specimen No. | Electrode width [μm] | Optimum operating voltage [V] |
|---|---|---|
| 1 | 20 | 160 |
| 2 | 40 | 150 |
| 3 | 60 | 135 |
| 4 | 80 | 110 |

In this example in which the distance between the pair of opposed electrode terminal portions is equal to the lateral width of the window of the mask, the amount of transmittance change is reduced to less than 5% by making the width of the electrode terminal portion to be ⅔ to ⅓ of the lateral width of the window.

Figure 6:
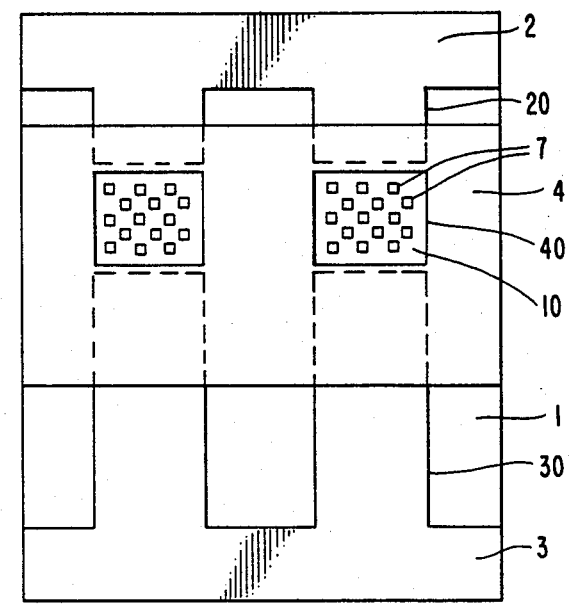
FIG. 6 is a schematic elevation view of a second embodiment of the electrooptic shutter array element of the invention.

FIG. 6 shows another embodiment of the electrooptic shutter array element according to the invention. Referring to FIG. 6, the width of each of the terminal portions 20 and 30 of the electrodes 2 and 3 is equal to the lateral width of the windows 40 of the mask 4, and in each area 10 on the surface of the PLZT substrate 1 corresponding to each of the windows 40 are provided a plurality of transparent conductor segments 7 distributed uniformly in the area 10. The electric field produced by the voltage applied between the pair of electrodes 2 and 3 is distributed at random in the area 10 so that a transmittance distribution similar to that as shown in FIG. 4 is obtained.

EXAMPLE 2

Figure 7:
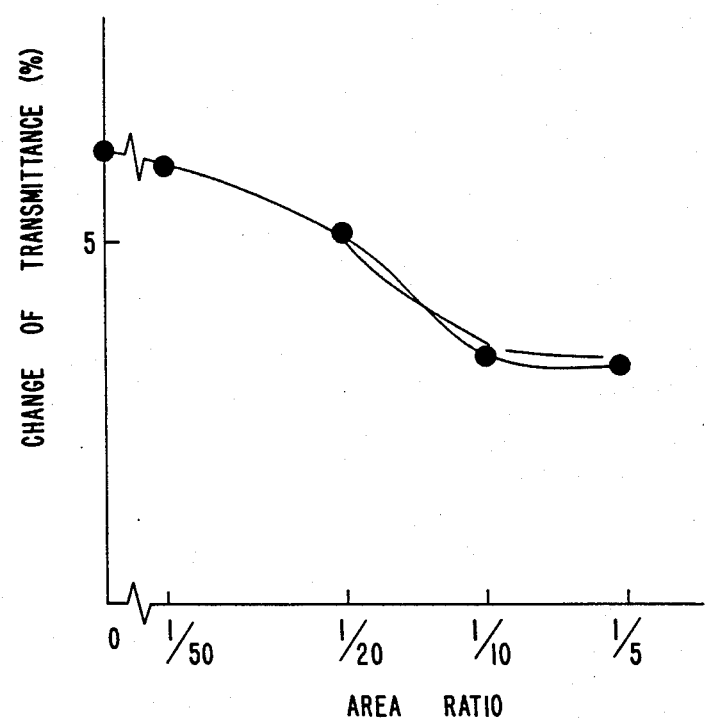
FIG. 7 is a graph showing the relation between a ratio of the area of the transparent conductor segments with respect to the opening area and the change of transmittance in a range of temperature of 20° to 60° C.

Specimens were provided with the same dimensions as those of Example 1 except that the width of the electrode terminal portion is the same as the lateral width of the window of the mask (60 μm). The transparent conductor segments were produced by depositing an ITO transparent electrode to a thickness of 1000 Å, and shaping by photolithography into 5 μm×5 μm segments. The ratio of the total area of the transparent conductor segments to the area of the window was changed by changing the number of the conductor segments. The thus obtained specimens were operated by applying an operating voltage of 120 V in a temperature range from 20° C. to 60° C. The amount of transmittance change with respect to the area ratio is shown in FIG. 7. The transmittance change becomes minimum when the area ratio is 1/10 to 1/5.

Figure 8:
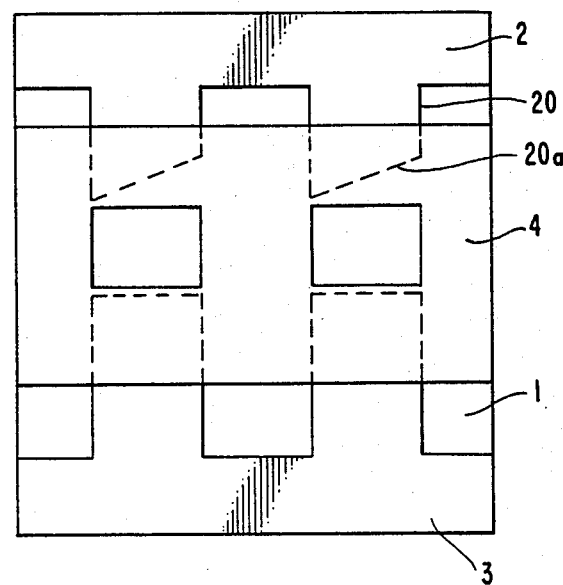
FIG. 8 is a schematic elevation view of a third embodiment of the electrooptic shutter array element of the invention.

FIG. 8 shows still another embodiment of the electrooptic shutter array element according to the invention. Referring to FIG. 8, the end 20a of each of the terminal portions 20 of the electrode 2 is at an angle to the opposed terminal portion on the other electrode of the pair. By this arrangement, the electric field between each pair of opposing electrode terminal portions is distributed so that the intensity of the electric field changes gradually within the area corresponding to the window of the mask to produce a transmittance distribution similar to that as shown in FIG. 4.

EXAMPLE 3

Figure 9:
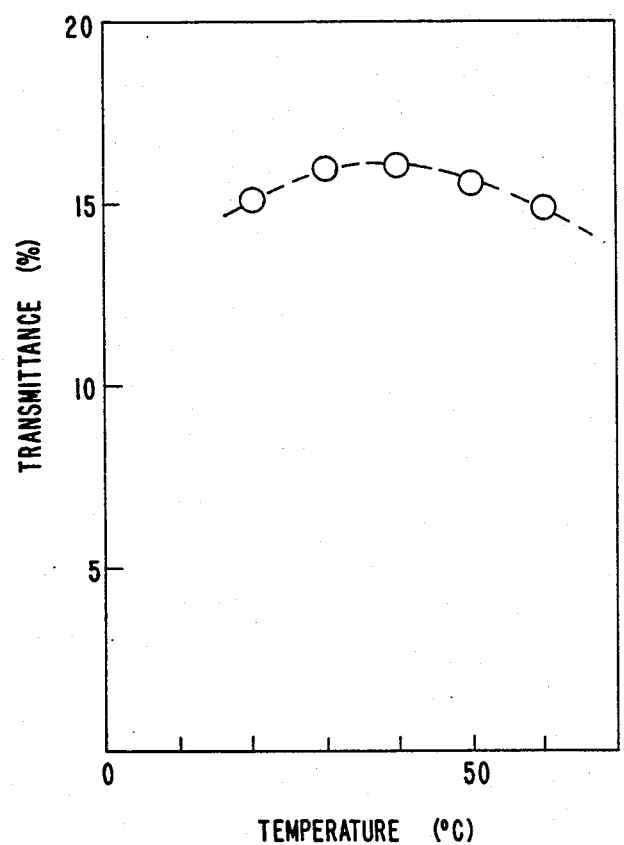
FIG. 9 is a graph showing the transmittance change with respect to temperature change in the third embodiment.

Specimens were provided with the same dimensions as those of Example 1 except that the width of the electrode terminal portion was equal to the lateral width of the window of the mask and the distances between the pair of opposing electrode terminal portions were 60 μm between the nearest end and 90 μm between the farthest end. The specimens were operated by applying an operating voltage of 150 V in a temperature range from 20° C. to 60° C. The transmittance with respect to the temperature is shown in FIG. 9.

In the foregoing description, three embodiments have been described for achieving the distribution of transmittance as shown in FIG. 4. These embodiments may be combined to obtain any characteristic of the transmittance change with respect to the temperature change. Further other various changes and modifications may be made within the scope of the present invention.

What is claimed is:

1. An electrooptic shutter array element comprising:
   a light transmissive substrate made of a material having the Kerr effect and having front and back major surfaces;
   a pair of electrodes on at least one of the front and back major surfaces of said light transmissive substrate, each electrode of the pair having a plurality of terminal portions with the terminal portions of one electrode of each pair being in spaced opposed relation to the corresponding terminal portions on the other electrode of the pair, one end of each of said terminal portions on one of said electrodes of the pair of electrodes being at an angle to the opposed terminal portion on the other electrode of the pair of electrodes;
   a light shading mask over the electrodes on said light transmissive substrate and having a plurality of windows therein at positions corresponding to the areas between the spaced opposed terminal portions; and
   a pair of light polarizing plates having polarizing axes which are perpendicular to each other and being provided on the front and back major surfaces of said light transmissive substrate,
   whereby in each of the areas on the surface of said light transmissive substrate corresponding to said windows of said mask the electric field produced by a voltage applied between said pair of electrodes is so distributed that a transmittance of said light transmissive substrate within each of the areas is substantially constant with respect to a temperature change.

2. An electrooptic shutter array element as claimed in claim 1 in which said light transmissive substrate is made of a PLZT material.

3. An electrooptic shutter array element comprising:
a light transmissive substrate made of a material having the Kerr effect and having front and back major surfaces;
a pair of electrodes on at least one of the front and back major surfaces of said light transmissive substrate, each electrode of the pair having a plurality of terminal portions with the terminal portions of one electrode of each pair being in spaced opposed relation to the corresponding terminal portions on the other electrode of the pair,
a light shading mask over the electrodes on said light transmissive substrate and having a plurality of windows therein at positions corresponding to the areas between the spaced opposed terminal portions, the width of each of said terminal portions of the electrodes of said pair of electrodes being less than the width of the corresponding windows of said mask; and
a pair of light polarizing plates having polarizing axes which are perpendicular to each other and being provided on the front and back major surfaces of said light transmissive substrate,
whereby in each of the areas on the surface of said light transmissive substrate corresponding to said windows of said mask the electric field produced by a voltage applied between said pair of electrodes is so distributed that a transmittance of said light transmissive substrate within each of the areas is substantially constant with respect to a temperature change.

4. An electrooptic shutter array as claimed in claim 3 in which the width of each of said terminal portions is from ⅛ to ⅜ the width of the corresponding window in said mask.

5. An electrooptic shutter array as claimed in claim 3 in which said light transmissive substrate is made of a PLZT material.

6. An electrooptic shutter array element comprising:
a light transmissive substrate made of a material having the Kerr effect and having front and back major surfaces;
a pair of electrodes on at least one of the front and back major surfaces of said light transmissive substrate, each electrode of the pair having a plurality of terminal portions with the terminal portions of one electrode of each pair being in spaced opposed relation to the corresponding terminal portions on the other electrode of the pair,
a light shading mask over the electrodes on said light transmissive substrate and having a plurality of windows therein at positions corresponding to the areas between the spaced opposed terminal portions;
a plurality of transparent conductor segments provided on said major surface of said light transmissive substrate in areas corresponding to said windows in said mask; and
a pair of light polarizing plates having polarizing axes which are prependicular to each other and being provided on the front and back major surfaces of said light transmissive substrate,
whereby in each of the areas on the surface of said light transmissive substrate corresponding to said windows of said mask the electric field produced by a voltage applied between said pair of electrodes is so distributed that a transmittance of said light transmissive substrate within each of the areas is substantially constant with respect to a temperature change.

7. An electrooptic shutter array element according to claim 6, wherein the ratio of the areas of said plurality of transparent conductor segments to the areas on the major surface of said light transmissive substrate corresponding to said windows of said mask is 1/10 to 1/5.

8. An electrooptic shutter array element according to claim 6, wherein said light transmissive substrate is made of a PLZT material.

* * * * *